(12) United States Patent
Glover

(10) Patent No.: US 6,776,427 B2
(45) Date of Patent: Aug. 17, 2004

(54) TOY VEHICLE HAVING REMOVABLE SCOOTER WHEELS, AND METHODS

(75) Inventor: Donald R. Glover, Mahtomedi, MN (US)

(73) Assignee: The Prophet Corp., Owatonna, MN (US)

( * ) Notice: Subject to any disclaimer, the term of this patent is extended or adjusted under 35 U.S.C. 154(b) by 72 days.

(21) Appl. No.: 09/863,092

(22) Filed: May 22, 2001

(65) Prior Publication Data

US 2002/0175483 A1 Nov. 28, 2002

(51) Int. Cl.⁷ .............................................. B62M 1/00
(52) U.S. Cl. ...................... 280/87.01; 280/15; 280/79.2
(58) Field of Search ........................... 280/14.1, 15, 18, 280/19, 32.6, 33.998, 87.01, 87.042, 87.021, 87.043, 87.24, 408, 79.11, 79.2, 30; D12/6; D34/23

(56) References Cited

U.S. PATENT DOCUMENTS

| | | | |
|---|---|---|---|
| 1,052,722 A | | 2/1913 | Hegel |
| 1,267,050 A | | 5/1918 | Brigel |
| 1,510,585 A | | 10/1924 | Cushing, Sr. et al. |
| 1,607,771 A | * | 11/1926 | Miller ......................... 104/135 |
| 2,219,905 A | | 10/1940 | Prickman |
| 2,246,628 A | * | 6/1941 | Heckman ................... 280/32.6 |
| 2,288,568 A | * | 6/1942 | Holmes ...................... 280/32.6 |
| 3,197,227 A | | 7/1965 | Anselmo |
| 3,339,939 A | | 9/1967 | Bowers |
| 3,374,000 A | * | 3/1968 | Wetzel ......................... 280/16 |
| 3,604,722 A | | 9/1971 | Boley |
| 3,633,774 A | * | 1/1972 | Lee ............................... 414/809 |
| 3,705,730 A | * | 12/1972 | Bergsland ..................... 280/24 |
| 3,822,069 A | * | 7/1974 | Hoff ............................... 280/8 |
| 3,870,334 A | | 3/1975 | Cole |
| 3,921,239 A | * | 11/1975 | Sovia et al. .................... 280/18 |
| 3,944,258 A | * | 3/1976 | Christensen .................. 213/64 |
| 4,002,352 A | * | 1/1977 | Hager ......................... 280/408 |
| 4,062,557 A | * | 12/1977 | Roden ................... 280/87.042 |
| 4,077,644 A | * | 3/1978 | Roby et al. ............... 280/47.34 |
| 4,129,315 A | | 12/1978 | McCallum |
| 4,203,609 A | * | 5/1980 | Mitchell et al. .......... 280/47.11 |
| D266,100 S | | 9/1982 | Miller |
| 4,458,906 A | * | 7/1984 | Lamson ................... 280/47.34 |
| 5,052,703 A | * | 10/1991 | Bertrand .................. 280/47.34 |
| 5,106,109 A | * | 4/1992 | Tattersall et al. .............. 152/9 |
| D367,140 S | * | 2/1996 | Reese ......................... D34/23 |
| 5,524,915 A | * | 6/1996 | Liu ............................... 280/30 |
| 5,527,051 A | * | 6/1996 | Plaza ......................... 280/32.6 |
| 5,551,715 A | * | 9/1996 | Pickard ................... 280/43.24 |
| 5,810,376 A | * | 9/1998 | Matheny ................. 280/87.021 |
| 5,863,053 A | * | 1/1999 | Berry ......................... 280/32.6 |
| 5,947,489 A | * | 9/1999 | Tucker ....................... 280/32.6 |
| 5,947,495 A | * | 9/1999 | Null et al. ............... 280/87.01 |
| 5,957,482 A | * | 9/1999 | Shorter ..................... 280/47.35 |
| 5,992,865 A | * | 11/1999 | Vargas .................... 280/87.041 |
| 6,095,348 A | * | 8/2000 | Karashima .................. 211/175 |
| 6,199,880 B1 | * | 3/2001 | Favorito et al. ......... 280/14.28 |
| 6,213,484 B1 | * | 4/2001 | Rohner ................... 280/87.042 |
| 6,276,471 B1 | * | 8/2001 | Kratzenberg et al. ...... 180/19.3 |
| 6,276,700 B1 | * | 8/2001 | Way et al. .................. 280/267 |
| 6,419,248 B1 | * | 7/2002 | Kay ........................... 280/87.01 |
| 6,550,794 B1 | * | 4/2003 | Spindel et al. ........... 280/79.11 |
| 6,561,530 B2 | * | 5/2003 | Carbonero ............. 280/87.041 |

\* cited by examiner

*Primary Examiner*—Brian L. Johnson
*Assistant Examiner*—Christopher Bottorff
(74) *Attorney, Agent, or Firm*—Merchant & Gould P.C.

(57) ABSTRACT

A toy sled for use with a wheeled item such as a floor scooter. The sled has a body having a top surface and a bottom surface, the top surface adapted for receiving a rider thereon and the bottom surface adapted for receiving the scooter. The scooter can be removed and replaced, as desired, from the body of the sled. Multiple scooters can be used with the sled.

8 Claims, 2 Drawing Sheets

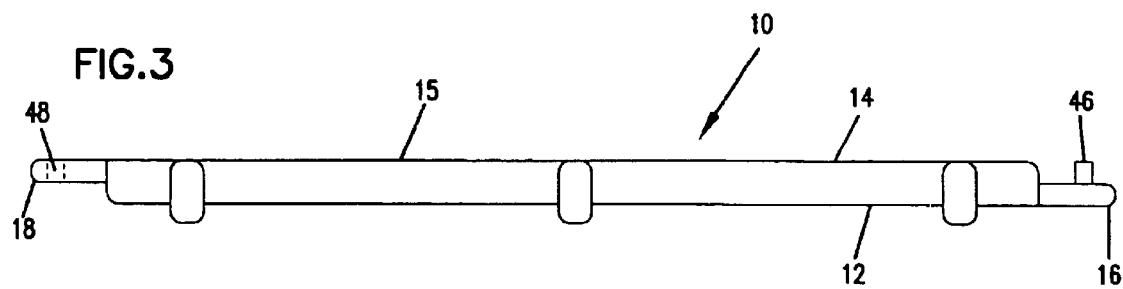
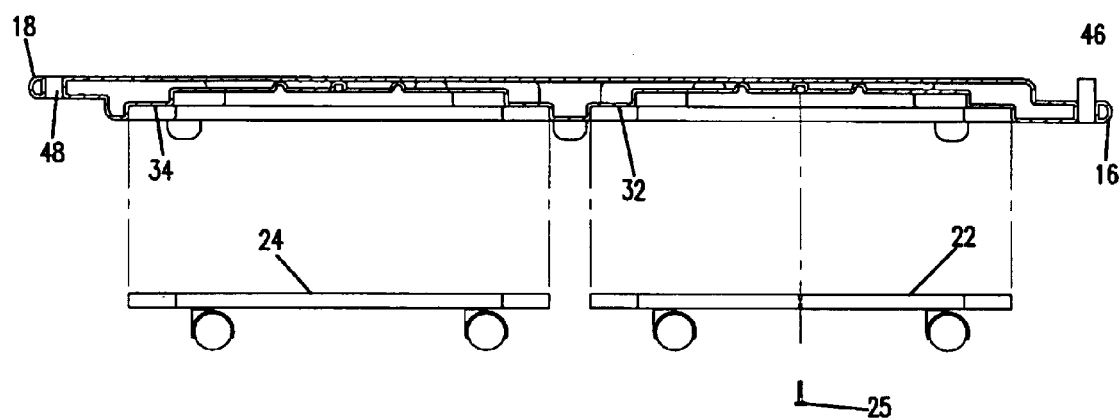
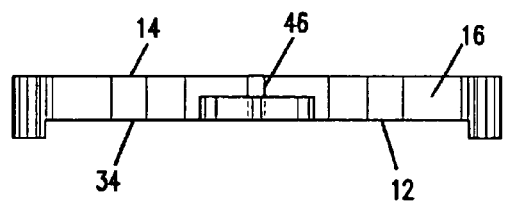
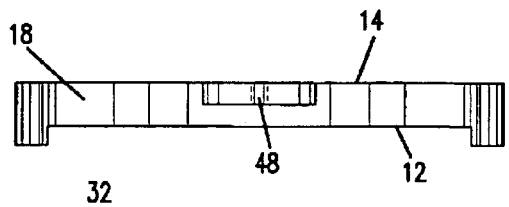

TOY VEHICLE HAVING REMOVABLE SCOOTER WHEELS, AND METHODS

FIELD OF THE INVENTION

This invention generally relates to toy sleds or similar, non-motorized riding devices having wheels. More particularly, this invention relates to toy sleds for which the wheels are either permanently or removably mounted thereon.

BACKGROUND

A floor scooter is a well known, popular, toy vehicle that simulates sledding on snow or ice, without needing the snow or ice. All that is needed is a fairly smooth surface. These scooters generally include a flat base piece, such as a piece of plywood, metal or plastic, with wheels mounted on the bottom of the base. Each wheel generally rotates independently of the other wheels. The base piece may have handles to improve retention of the rider on the scooter. Typically the base piece is shaped and sized so that only one child rider can fit on the scooter comfortably. Examples of base shapes include square, rectangular, oval or circular, and crescent shaped. Common sizes of scooters include 12 inch and 16 inch diameters.

The scooters are usually used indoors in school gymnasiums and other such indoor locations, and also in outdoor locations. Outdoors, scooters are used on secured asphalt or concrete surfaces and other generally smooth areas. Such scooters are well known both by kids and parents, largely because many kids use these scooters for activities in school, as did their parents during their childhood. As known by anyone who has ever ridden on one, these scooters provide an exhilarating ride, but generally only to the one person sitting on it.

What is desired is a wheeled toy, similar to a scooter, that can accommodate multiple riders and that is more stable.

SUMMARY OF INVENTION

The present invention is directed to a play sled that is constructed to accept, and to have removable therefrom, a floor scooter having wheels or casters. In some embodiments, the wheels are permanently mounted. When the scooter is attached to the body of the sled, the wheels of the floor scooter are the wheels that provide mobility to the sled. When desired, the floor scooter can be removed from the sled, allowing use of the scooter alone.

The sled is preferably shaped and sized to accommodate at least two floor scooters and also several riders, thus multiplying the amount of fun that is obtained. Additionally, multiple sleds can be attached together to provide a chain or train of sleds.

In one particular aspect, this invention is directed to a toy sled that has a body and a wheeled item, such as a floor scooter, attached to the body. The body has a top surface and a bottom surface, the top surface adapted for receiving a rider thereon and the bottom surface adapted for receiving the wheeled item. The wheeled item, which comprises a base piece and a plurality of wheels rotatably connected to the base piece, is removably secured to the bottom surface of the body. In some embodiments, the wheeled item is permanently secured to the bottom surface of the body. For preferred aspects of the invention, multiple wheeled items, such as two floor scooters, are attached to the body.

In another particular aspect, this invention is directed to a toy sled that has a body having a top surface and a bottom surface. The top surface is adapted for receiving a rider thereon. The bottom surface has a first scooter engagement region and a second scooter engagement region, the first scooter engagement region adapted to releaseably receive a first scooter and the second scooter engagement region adapted to releaseably receive a second scooter. The body could alternately or additionally be adapted to receive other wheeled items, such as skateboards.

Other aspects of the invention will be apparent with the aid of the following drawings and description.

BRIEF DESCRIPTION OF THE DRAWINGS

The present invention may be best understood by reference to the following description taken in connection with the accompanying drawings, in which like reference characters are used to designate like parts throughout the several views.

FIG. 3 is a side plan view of the toy sled of FIGS. 1 and 2;

FIG. 4 is a cross-sectional side view of the toy sled taken along line 4—4 of FIG. 1 showing floor scooters aligned for connection with the toy sled;

FIG. 5 is a first end view of the toy sled of the preceding FIGS.; and

FIG. 6 is a second, opposite end view of the toy sled of the preceding FIGS.

DETAILED DESCRIPTION OF THE PREFERRED EMBODIMENT

Figure 1:
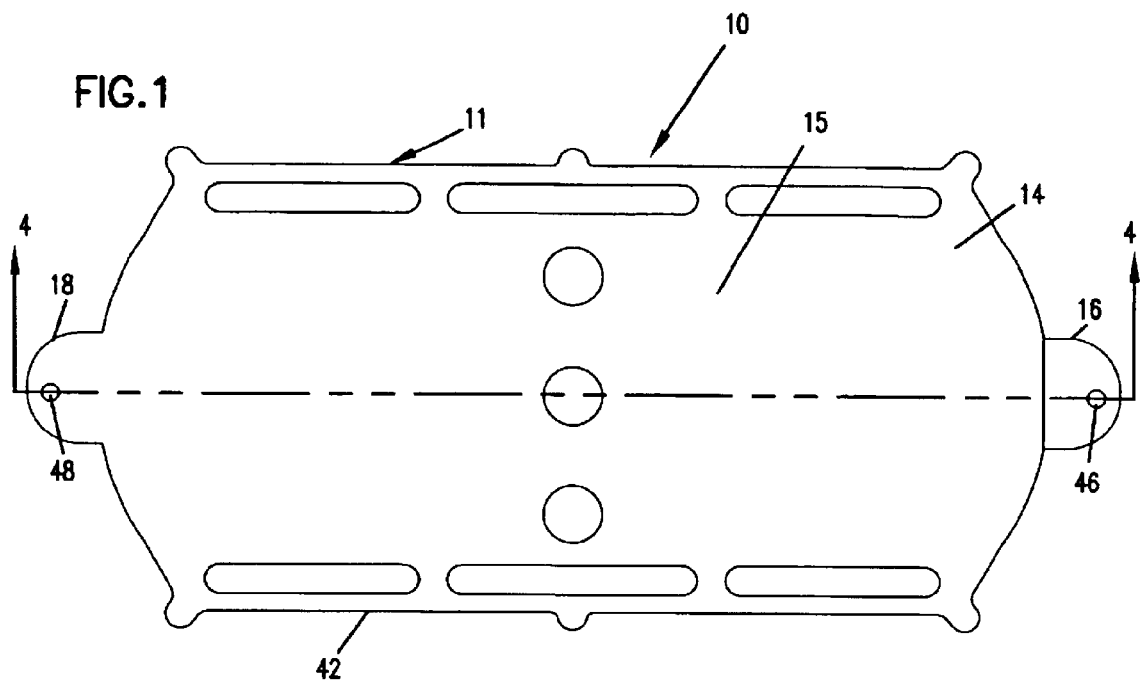
FIG. 1 is a top plan view of a toy sled according to the principles of the present invention.

Referring now to the drawings, and in particular to FIG. 1, there is shown a toy sled 10 in accordance with the principles of the present invention. Sled 10 is defined by a body 11 having a generally stiff and planar structure having a bottom surface 12 and an opposite top surface 14, as seen in FIG. 3. Riders on sled 10 would be seated on top surface 14, specifically, on a seating surface 15. Body 11 further has a first end 16 and second end 18 opposite first end 16. Positioned between first end 16 and second end 18 is seating surface 15.

Figure 2:
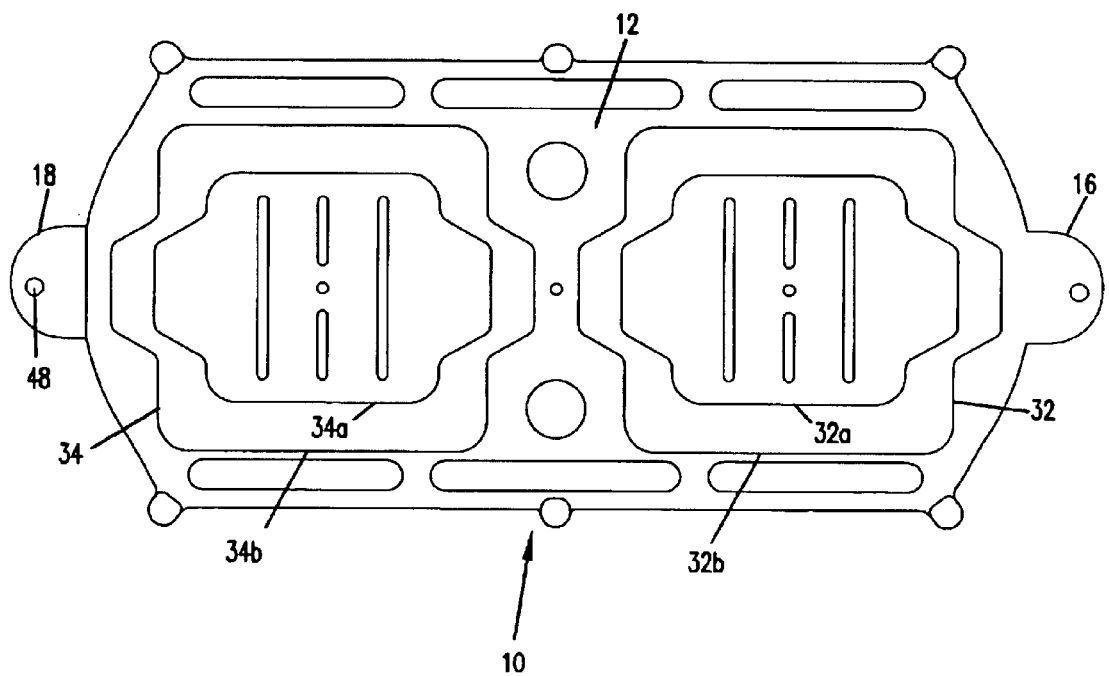
FIG. 2 is a bottom plan view of the toy sled of FIG. 1.

As seen in FIG. 2, bottom surface 12 includes a first scooter engagement region 32 and a second scooter engagement region 34. Each of these regions 32, 34 is shaped and sized to accept a floor scooter, such as those described in the Background section of this application. Floor scooters that are suitable for use with sled 10 of the present invention are available, for example, from Gopher Sport of Owatonna, Minn. The wheels of floor scooters are generally each individually mounted to the base piece of the scooter; each wheel is a castor. Sled 10 could be designed for use with other wheeled items, such as skateboards, which have the wheel mounted on an axle. Wheeled items known as dollies may also be used with sled 10. No matter what type of wheeled item is used, the wheels may rotate independently from one another or may be connected in some manner. Additionally, although bottom surface 12 is configured to accept two scooters, in first scooter engagement region 32 and a second scooter engagement region 34, bottom surface 12 could be configured to accept only one scooter, or more than two scooters, such as three, four or more scooters.

In the particular embodiment shown in FIG. 2, first scooter engagement region 32 includes an inner region 32a for engaging a square scooter having a 12 inch diameter and an outer region 32b for engaging a square scooter having a 16 inch diameter. Each of regions 32a, 32b are configured to accept a scooter having opposite handles projecting from the base piece of the scooter. Similarly, second scooter engagement region 34 includes an inner region 34a for engaging a square scooter having a 12 inch diameter and an outer region 34b for engaging a square scooter having a 16 inch diameter. In FIG. 2, inner regions 32a, 34a and outer regions 32b, 34b share a center point. It is understood that any number of scooter engagement regions can be present in bottom surface 12.

In FIG. 4, a first scooter 22 is shown aligned for insertion and retention into first scooter engagement region 32 and a second scooter 24 is shown aligned for insertion and retention into second scooter engagement region 34. Preferably, when using sled 10, a scooter is retained in each scooter engagement region. Scooters 22, 24 shown are configured for insertion and retention into outer region 32b and outer region 34b, respectively. As stated above, scooters 22, 24 can have any shape and size, but scooters 22, 24 are generally chosen to correspond to first and second scooter engagement regions 32, 34. In some embodiments of sled 10, first scooter engagement region 32 may vary from second scooter engagement region 34, for example, in shape or size of the scooter acceptable therein. It is feasible to have two different sized or shaped scooters used with sled 10. For example, scooter 22 can be a 12 inch scooter for insertion and retention into region 32a, and scooter 24 can be a 16 inch scooter for insertion and retention into region 34b. Engagement regions 32, 34 are configured to accept handled scooters 22, 24 in an orientation with the handles axially aligned with body 11. In other embodiments, scooters 22, 24 can be positioned with any handles aligned transverse or lateral to body 11.

Scooters 22, 24 are securely retained on bottom surface 12 within first and second scooter engagement regions 32, 34 by an attachment mechanism 25. Preferably, attachment mechanism 25 is of the type that allows attachment, removal, and replacement of scooters 22, 24 within regions 32, 34. Examples of suitable attachment mechanism 25 include mechanical systems such as bolts, screws, clips, pins, hook & loop or other reclosable fastener systems. The mechanical systems may include an external item that is not connected to or part of body 11, such as a pin or screw; or, the mechanical system may be an integral part of body 11, such as a tab or ear that is constructed to engage with scooter 22, 24. Examples of suitable adhesive attachment system include glue, tape or other pressure sensitive adhesives or materials. It may even be feasible to use the friction between scooters 22, 24 and body 11, particularly engagement regions 32, 34, to retain scooters 22, 24 therein. In the particular embodiment shown in FIG. 4, attachment mechanism 25 includes a bolt that can be passed through a central hole in scooters 22, 24 and engaged with body 11, for example, with a threaded aperture or recess.

Sled 10 includes a connection system for attaching multiple sleds 10 together to form a chain or train. As best seen in FIGS. 3 and 4, first end 16 includes a connector such as a hitch 46 that is constructed to engage with a connector receptor, such as a retention aperture 48, located at second end 18. To connect a first sled 10 with a second sled 10, hitch 46 from the first sled is passed through and positioned in retention aperture 48 of the second sled. Other connecting systems, such as a rope or other means, could be used to connect multiple sleds 10. Two, three, four, or any number of sleds 10 can be connected to form a long chain.

Sled 10, in particular body 11, can be made from any material, such as wood, metal, or hard rubber, but preferably body 11 is made from a polymeric or plastic material. The plastic material used for body 11 can be either a thermoset or thermoplastic polymeric material, mainly because these plastic materials are easy to shape and are fairly light weight. Examples of materials suitable for body 11 include, but are not limited to, polyethylenes, polypropylenes, polycarbonates, hard polyurethanes, polyesters, acrylics, polystyrenes, polyvinyl chlorides, nylons, and epoxies. A preferred material is high density polyethylene (HDPE). Any known adjuvants, such as plasticizers, flowing agents, antistatic agents, pigments, and the like can be added to the polymeric materials to impart desired properties to body 11 or to facilitate making of body 11. Reinforcing materials, such as fibers or scrims can be used in conjunction with the plastic material to strengthen or toughen body 11.

Plastic materials, such as those listed above, are preferably molded to form body 11. Suitable molding techniques include blow molding, injection molding, and rotationally molded, although it is understood that any technique acceptable to form body 11 can be used. Body 11 may be formed as a single piece or may be multiple pieces joined together. As illustrated in FIG. 4, at least a portion of body 11 can be hollow, which can be beneficial to decrease the weight of sled 10 or to decrease the amount of material needed to form body 11.

As stated above, body 11 of sled 10 is generally a stiff, planar structure. Body 11 should be sufficiently stiff or rigid to support the weight of the desired number of riders when scooters 22, 24 are installed. To increase the torsional strength of body 11, ribs or other features may be incorporated into body 11, such as on bottom surface 12.

Seating surface 15 on top surface 14 may include depressions or other features such as a backrest to improve the comfort or stability of any rider or riders on sled 10. Body 11 can have any other features included therein or thereon. Best seen in FIGS. 1 and 2, sled 10 can include handles 42 that are molded into body 11. Handles 42 extend out from body 11 generally planar to top surface 14 and to bottom surface 12. In other embodiments, handles may extend out and away from top surface 14 and not be planar with top surface 14. Sled 10 can be designed so that a plurality of bodies 11, with or without scooters 22, 24 attached thereto, are stackable, preferably nestable, when not in use.

Sled 10 can be shaped and sized as desired, depending on the desired carrying capacity and clearance needed for operation of sled 10. Theoretically, sled 10 can be essentially any shape and size, but will generally be no greater than about 100 inches in the largest dimension. The shape of sled 10 is typically elongate, in that it has a length from first end 16 to second end 18 greater than its width. A preferred shape for sled 10 is generally rectangular, with rounded corners. In the preferred embodiment, sled 10 has a length, from first end 16 to second end 18 of about 53 inches, and a maximum width of about 23 inches. The thickness of body 11, without scooters 22, 24 attached, is about 3 inches.

To use sled 10, at least one scooter, such as scooter 22, is attached to bottom surface 12 at first scooter engagement region 32. Preferably at least a second scooter 24 is attached to bottom surface 12 at second scooter engagement region 34. Attachment mechanism 25 secures scooters 22, 24 to bottom surface 12. Attachment of scooters 22, 24 will generally be more convenient if body 11 is overturned so that bottom surface 12 is exposed. Once scooters 22, 24 are attached, sled 10 should be righted so that the wheels of scooters 22, 24 contact the surface on which sled 10 will be rolled.

The desired number of riders seat themselves on seating surface 15 and enjoy the ride. Sled 10 may be pushed or pulled by an external force, such as a person not seated on sled 10, or the riders may use various means to propel sled 10. The riders can use their hands or feet to push or pull themselves, or they can use external elements, such as poles or paddles to propel sled 10. Care should be taken that sled 10 does not achieve excessive rates of speed. If desired, multiple sleds 10 can be connected to form a chain of sleds 10.

When finished riding, scooters 22, 24 can be removed from bottom surface 12 or left attached, and body 11 set aside for storage. Multiple bodies 11 can be nested, stacked, and stored until the next use of sled 10.

The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A toy sled comprising:
   (a) a body having a top surface and a bottom surface, the top surface adapted for receiving a plurality of riders thereon, the body further having a handle generally planar with the top surface and the bottom surface;
   (b) the bottom surface defining a first scooter engagement recess including a first attachment mechanism receptacle centrally positioned in the first scooter engagement recess, and a second scooter engagement recess including a second attachment mechanism receptacle centrally positioned in the second scooter engagement recess, the first and second scooter engagement recesses longitudinally aligned, the first scooter engagement recess adapted to releaseably receive a first scooter comprising a base and a plurality of wheels rotatably attached to the base, and the second scooter engagement recess adapted to releaseably receive a second scooter comprising a base and a plurality of wheels rotatably attached to the base; and
   (c) a first attachment mechanism for removably securing the first scooter to the first scooter recess using the first attachment mechanism receptacle and a second attachment mechanism for removably securing the second scooter to the second scooter recess using the second attachment mechanism receptacle.

2. The toy sled according to claim 1, wherein the attachment mechanism comprises a bolt.

3. The toy sled according to claim 1, wherein the body comprises a polymeric material.

4. The toy sled according to claim 3, wherein the polymeric material is polyethylene.

5. The toy sled according to claim 1, wherein the body further comprises a second handle generally planar with the top surface and the bottom surface.

6. The toy sled according to claim 1, wherein the body has a first end and an opposite second end, the first end having a connection and the second end having a connector receptor.

7. The toy sled according to claim 1, wherein the first scooter engagement recess and the second scooter engagement recess have a generally square shape.

8. The toy sled according to claim 5, wherein the first handle is positioned at a first side of the body and the second handle is positioned at a second side of the body opposite the first side.

* * * * *

UNITED STATES PATENT AND TRADEMARK OFFICE
CERTIFICATE OF CORRECTION

PATENT NO. : 6,776,427 B2 Page 1 of 1
DATED : August 17, 2004
INVENTOR(S) : Glover It is certified that error appears in the above-identified patent and that said Letters Patent is hereby corrected as shown below:

Column 6,
Line 24, "a connection and" should read -- a connector and --

Signed and Sealed this

Thirtieth Day of November, 2004

JON W. DUDAS
*Director of the United States Patent and Trademark Office*